United States Patent
Lin et al.

(10) Patent No.: US 10,142,297 B2
(45) Date of Patent: Nov. 27, 2018

(54) SECURE COMMUNICATION METHOD AND APPARATUS

(71) Applicant: RIVER SECURITY INC., Shanghai (CN)

(72) Inventors: Yumin Lin, Shanghai (CN); Hongyong Xiao, Shanghai (CN); Lin Zheng, Shanghai (CN); Ming Xu, Shanghai (CN)

(73) Assignee: RIVER SECURITY INC., Shanghai (CN)

( * ) Notice: Subject to any disclaimer, the term of this patent is extended or adjusted under 35 U.S.C. 154(b) by 163 days.

(21) Appl. No.: 15/146,814

(22) Filed: May 4, 2016

(65) Prior Publication Data

US 2016/0337321 A1 Nov. 17, 2016

(30) Foreign Application Priority Data

May 14, 2015 (CN) .......................... 2015 1 0245307

(51) Int. Cl.
*H04L 29/06* (2006.01)
*H04L 9/32* (2006.01)
(Continued)

(52) U.S. Cl.
CPC ............ *H04L 63/0428* (2013.01); *H04L 9/14* (2013.01); *H04L 9/30* (2013.01); *H04L 9/3263* (2013.01);
(Continued)

(58) Field of Classification Search
CPC ... H04L 63/0428; H04L 63/0807; H04L 9/14; H04L 9/3263; H04L 63/061; H04L 9/30; H04L 63/0281
(Continued)

(56) References Cited

U.S. PATENT DOCUMENTS

| | | |
|---|---|---|
| 5,805,803 A | 9/1998 | Birrell et al. |
| 6,327,662 B1 | 12/2001 | Araujo |

(Continued)

FOREIGN PATENT DOCUMENTS

| | | |
|---|---|---|
| CN | 1732465 | 2/2006 |
| CN | 101217367 A | 7/2008 |

(Continued)

OTHER PUBLICATIONS

From PCT/CN2016/079856, International Search Report (ISR) dated Jul. 11, 2016 with English translation from WIPO.

(Continued)

*Primary Examiner* — Mohammad W Reza
(74) *Attorney, Agent, or Firm* — Ladas & Parry, LLP

(57) ABSTRACT

The present invention provides a secure communication method and apparatus. A security proxy device is arranged between a client and a server. The method comprises: the security proxy device using a key exchange mechanism to perform connection key agreement with the client; and assigning a token for the client after identity authentication for the client succeeds; upon receiving a request sent by the client to the server, validating whether the token sent together with the request is a token assigned for the client; if the validation succeeds, forwarding to the server a request obtained by using the connection key or a token connection key to decrypt the request, wherein the token connection key is assigned for the client and then sent to the client by using the connection key; after receiving a response returned by the server, using the connection key or token connection key to encrypt the response, and forwarding the encrypted response to the client. The present invention improves security of communication between the client and the server, and can effectively protect the server and client from various replay, injection of malicious codes and automated attacks.

30 Claims, 3 Drawing Sheets

(51) Int. Cl.
*H04L 9/30* (2006.01)
*H04L 9/14* (2006.01)

(52) U.S. Cl.
CPC ........ *H04L 63/061* (2013.01); *H04L 63/0807* (2013.01); *H04L 63/0281* (2013.01)

(58) Field of Classification Search
USPC ........................................................ 713/153
See application file for complete search history.

(56) References Cited

U.S. PATENT DOCUMENTS

| | | | |
|---|---|---|---|
| 6,965,939 | B2 | 11/2005 | Cuomo et al. |
| 7,421,576 | B1 * | 9/2008 | Kent ................... H04L 63/0838 380/277 |
| 8,407,776 | B2 | 3/2013 | Somani et al. |
| 8,447,983 | B1 | 5/2013 | Beck et al. |
| 2002/0026578 | A1 | 2/2002 | Hamann et al. |
| 2004/0128393 | A1 | 7/2004 | Blakley, III et al. |
| 2004/0158708 | A1 | 8/2004 | Peyravian et al. |
| 2005/0005133 | A1 | 1/2005 | Xia et al. |
| 2005/0154887 | A1 | 7/2005 | Birk et al. |
| 2006/0004662 | A1 * | 1/2006 | Nadalin ................ H04L 63/02 705/50 |
| 2006/0225132 | A1 * | 10/2006 | Swift ..................... G06F 21/33 726/11 |
| 2007/0107048 | A1 | 5/2007 | Halls et al. |
| 2007/0226483 | A1 | 9/2007 | Cox et al. |
| 2010/0281522 | A1 | 11/2010 | Hatakeyama |
| 2011/0066681 | A1 | 3/2011 | Shiota et al. |
| 2012/0206317 | A1 | 8/2012 | Wong et al. |
| 2015/0121501 | A1 | 4/2015 | Khalid et al. |
| 2015/0319174 | A1 | 11/2015 | Hayton et al. |
| 2016/0036833 | A1 | 2/2016 | Ardeli et al. |
| 2016/0142409 | A1 | 5/2016 | Frei et al. |
| 2016/0234298 | A1 | 8/2016 | Takeda et al. |
| 2016/0261581 | A1 | 9/2016 | Wang et al. |
| 2016/0337321 | A1 | 11/2016 | Lin et al. |
| 2017/0012978 | A1 | 1/2017 | Lin et al. |
| 2017/0230696 | A1 | 8/2017 | Agnihotri et al. |
| 2017/0244713 | A1 | 8/2017 | Sun |

FOREIGN PATENT DOCUMENTS

| | | |
|---|---|---|
| CN | 101247391 A | 8/2008 |
| CN | 101674304 A | 3/2010 |
| CN | 101741764 A | 6/2010 |
| CN | 102111410 A | 6/2011 |
| CN | 102208980 A | 10/2011 |
| CN | 103095704 A | 5/2013 |
| CN | 103179115 A | 6/2013 |
| CN | 103780396 A | 5/2014 |
| CN | 104023085 A | 9/2014 |
| CN | 104038490 A | 9/2014 |
| CN | 104113528 A | 10/2014 |
| CN | 104350501 A | 2/2015 |
| CN | 105471833 A | 4/2016 |
| CN | 105491001 A | 4/2016 |

OTHER PUBLICATIONS

From PCT/CN2016/079856, Written Opinion (WO) dated Jul. 11, 2016 with English translation from WIPO.
From PCT/CN2016/079856, International Preliminary Report on Patentability (IPRP; CH 1) dated Nov. 14, 2017 with English translation from WIPO.
From Chinese Application No. 201510245307.2, Search Report dated Jan. 9, 2018.
From Chinese Application No. 201510245307.2, Office Action dated Jan. 24, 2018 with English translation provided by Global Dossier.
From PCT/CN2016/079838, International Search Report dated Jul. 11, 2016 with English translation from WIPO.
From PCT/CN2016/079838, Written Opinion dated Jul. 11, 2016 with English translation from WIPO.
From PCT/CN2016/079838, International Preliminary Report on Patentability (IPRP; CH 1) dated Jul. 11, 2016 with English translation from WIPO.
From CN201510243743.6, Office Action and Search Report dated Aug. 19, 2016 with English translation from Global Dossier.
From CN201510243743.6, Office Action dated Oct. 10, 2016 with English translation from Global Dossier.
From CN201510243743.6, Office Action dated Dec. 6, 2016 with English translation from Global Dossier.
From CN201510243743.6, Supplementary Search dated Jan. 3, 2017 with English translation from Global Dossier.
From U.S. Appl. No. 15/147,780 (now U.S 2017-0012978 A1), Office Action dated Mar. 26, 2018.

* cited by examiner

SECURE COMMUNICATION METHOD AND APPARATUS

CROSS-REFERENCE TO RELATED APPLICATION

This application claims priority from Chinese Patent Application No. CN 201510245307.2, filed on May 14, 2015, the disclosure of which is hereby incorporated by reference in its entirety.

FIELD OF THE INVENTION

The present invention relates to the technical field of data security, and particularly to a secure communication method and apparatus.

BACKGROUND OF THE INVENTION

As network technology develops rapidly, previous communication between either a client of mobile equipment or a client of a PC and a server is confronted with serious security issues. The security issues mainly involve automated leakage of communication data, illegal Man-in-the-Middle Attack to the server, an illegal client's access to the server, and the like.

SUMMARY OF THE INVENTION

In view of the above, the present invention provides a secure communication method and apparatus to assist in improving security of communication between the client and the server.

Specific technical solutions are as follows:

The present invention provides a secure communication method which is executed by a security proxy device between a client and a server, the method comprising:

using a key exchange mechanism to perform connection key agreement with the client; and assigning a token for the client after identity authentication for the client succeeds;

upon receiving a request sent by the client to the server, validating whether the token sent together with the request is a token assigned for the client; if the validation succeeds, forwarding to the server a request obtained by using the connection key or a token connection key to decrypt the request, wherein the token connection key is assigned for the client and then sent to the client by using the connection key;

after receiving a response returned by the server, using the connection key or token connection key to encrypt the response, and forwarding the encrypted response to the client.

According to a preferred embodiment of the present invention, the identity authentication for the client is performed during the connection key agreement;

The token is assigned for the client after the connection key agreement.

According to a preferred embodiment of the present invention, the using a key exchange mechanism to perform connection key agreement with the client comprises:

using a key agreement protection key to decrypt data sent by the client and containing a Client-ID, wherein the key agreement protection key is configured in advance in the client and the security proxy device;

using the Client-ID obtained from the decryption to generate a server validation key;

using the server validation key to encrypt data containing a security proxy device ID, and sending the encrypted data to the client so that the client uses the Client-ID and the security proxy device ID to generate the connection key;

using the client-ID and the security proxy device ID to generate the connection key.

According to a preferred embodiment of the present invention, the using the server validation key to encrypt data containing a security proxy device ID comprises:

using a root certificate private key of the security proxy device to sign the security proxy device ID and the Client-ID;

using the server validation key to encrypt the signature and the certificate of the security proxy device.

According to a preferred embodiment of the present invention, the identity authentication for the client comprises:

authenticating the Client-ID after obtaining the Client-ID; and/or, validating Client Environment Information after obtaining the Client Environment Information; and/or, validating client signature information after obtaining the client signature information.

According to a preferred embodiment of the present invention, the authenticating the Client-ID comprises:

judging whether the Client-ID is in a preset blacklist: if no, the client passes the identity authentication; if yes, the client fails to pass the validation; or judging whether the Client-ID is in a preset whitelist: if yes, the client passes the identity authentication; if no, the client fails to pass the identity authentication.

According to a preferred embodiment of the present invention, the obtaining the Client Environment Information comprises:

using the connection key to decrypt the Client Environment Information sent by the client, wherein the Client Environment Information comprises at least one of a client device ID, a client application signature and a client environment parameter.

According to a preferred embodiment of the present invention, the obtaining the client signature information comprises:

using the Client-ID and the security proxy device ID to generate a client validation key, and using the client validation key to decrypt the client signature information sent by the client.

According to a preferred embodiment of the present invention, the assigning the token for the client comprises:

using a token key to encrypt data containing the connection key and a random parameter or encrypt data containing the toke connection key and the random parameter to obtain the token assigned for the client, the token key being preset in the security proxy device or dynamically generated by the security proxy device.

According to a preferred embodiment of the present invention, upon sending the token, further sending data obtained by using the connection key to encrypt the connection serial number, the connection serial number being generated by the security proxy device;

Upon decrypting the request, decrypting to obtain the connection serial number, further validating whether the connection serial number is correct, and forwarding the request obtained after decryption to the server only when the connection serial number is correct;

Upon encrypting the response, further encrypting the connection serial number, and sending the encrypted connection serial number to the client.

According to a preferred embodiment of the present invention, the method further comprises:

if it is validated that the token sent together with the request is not the token assigned for the client, refusing to process the request.

The present invention further provides a secure communication method. The method is applied to a system comprising a client, a security proxy device and a server. The method comprises:

The client using a key exchange mechanism to perform connection key agreement with the security proxy device, and obtaining a token assigned by the security proxy device to the client after identity authentication for the client succeeds;

using the connection key or a token connection key to encrypt the request sent to the server, and sending the encrypted request together with the token to the security proxy device;

obtaining a response forwarded from the security proxy device, and using the connection key or token connection key to decrypt the response;

wherein the token connection key is assigned by the security proxy device to the client and then encrypted using the connection key and then sent to the client.

According to a preferred embodiment of the present invention, the client using a key exchange mechanism to perform connection key agreement with the security proxy device comprises:

using the key agreement protection key to encrypt data containing a Client-ID, and sending the encrypted data to the security proxy device, wherein the key agreement protection key is configured in advance in the client and the security proxy device;

using the server validation key to decrypt data sent by the security proxy device and containing a security proxy device ID, the server validation key being generated by using the Client-ID;

using the Client-ID and the security proxy device ID obtained from decryption to generate the connection key.

According to a preferred embodiment of the present invention, the data containing a security proxy device ID comprises:

a security proxy device certificate, and a signature obtained by signing the security proxy device ID and the Client-ID by using a root certificate private key of the security proxy device.

According to a preferred embodiment of the present invention, the method further comprises:

the client sending at least one of the Client-ID, client environment information and client signature information to the security proxy device so that the security proxy device performs identity authentication for the client.

According to a preferred embodiment of the present invention, the client sending the client environment information to the security proxy device comprises:

using the connection key to encrypt the client environment information, and sending the encrypted client environment information to the security proxy device; the environment information comprises at least one of Client Device ID, Client Application Signature and Client Environment Parameter.

According to a preferred embodiment of the present invention, the client sending the client signature information to the security proxy device comprises:

using the Client-ID and the security proxy device ID to generate the client validation key, using the client validation key to encrypt the client signature information, and sending the encrypted client signature information to the security proxy device.

According to a preferred embodiment of the present invention, upon obtaining the token, further obtaining a connection serial number encrypted by using the connection key, and using the connection key to decrypt the obtained connection serial number;

upon encrypting the request, further encrypting the connection serial number;

upon decrypting the response, further decrypting to obtain the connection serial number, validating whether the connection serial number is correct, and discarding the response if the connection serial number is not correct.

The present invention further provides a secure communication apparatus in a security proxy device between a client and a server, the apparatus comprising:

a key agreement unit for using a key exchange mechanism to perform connection key agreement with the client;

an identity authenticating unit for performing identity authentication for the client;

a token assigning unit for assigning a token for the client after the identity authentication for the client succeeds;

a request processing unit for, after receiving the request sent by the client to the server, validating whether the token sent together with the request is a token assigned for the client; if the validation succeeds, forwarding to the server a request obtained by using the connection key or token connection key to decrypt the request, wherein the token connection key is assigned by the token assigning unit to the client and then encrypted using the connection key and then sent to the client;

a response processing unit for, after receiving a response returned by the server, using the connection key or token connection key to encrypt the response, and forwarding the encrypted response to the client.

According to a preferred embodiment of the present invention, the identity authenticating unit performs identity authentication for the client during the connection key agreement;

The token assigning unit assigns a token to the client after the connection key agreement.

According to a preferred embodiment of the present invention, the key agreement unit specifically performs the following:

using a key agreement protection key to decrypt data sent by the client and containing a Client-ID, wherein the key agreement protection key is configured in advance in the client and the security proxy device;

using the Client-ID obtained from the decryption to generate a server validation key;

using the server validation key to encrypt data containing a security proxy device ID, and sending the encrypted data to the client so that the client uses the Client-ID and the security proxy device ID to generate the connection key;

using the client-ID and the security proxy device ID to generate the connection key.

According to a preferred embodiment of the present invention, upon using the server validation key to encrypt data containing a security proxy device ID, the key agreement unit specifically performs the following:

using a root certificate private key of the security proxy device to sign the security proxy device ID and the Client-ID;

using the server validation key to encrypt the signature and the certificate of the security proxy device.

According to a preferred embodiment of the present invention, the identity authenticating unit is specifically configured to:

authenticate the Client-ID after obtaining the Client-ID; and/or, validate Client Environment Information after obtaining the Client Environment Information; and/or, validate client signature information after obtaining the client signature information.

According to a preferred embodiment of the present invention, upon performing authentication for the Client-ID, the identity authenticating unit is specifically configured to:

judge whether the Client-ID is in a preset blacklist: if no, the client passes the identity authentication; if yes, the client fails to pass the validation; or judge whether the Client-ID is in a preset whitelist: if yes, the client passes the identity authentication; if no, the client fails to pass the identity authentication.

According to a preferred embodiment of the present invention, upon obtaining the Client Environment Information, the identity authenticating unit is specifically configured to:

use the connection key to decrypt the Client Environment Information sent by the client, wherein the Client Environment Information comprises at least one of a client device ID, a client application signature and a client environment parameter.

According to a preferred embodiment of the present invention, upon obtaining the client signature information, the identity authenticating unit is specifically configured to:

use the Client-ID and the security proxy device ID to generate a client validation key, and use the client validation key to decrypt the client signature information sent by the client.

According to a preferred embodiment of the present invention, upon assigning the token for the client, the token assigning unit is specifically configured to:

use a token key to encrypt data containing the connection key and a random parameter or encrypt data containing the toke connection key and the random parameter to obtain the token assigned for the client, the token key being preset in the security proxy device or dynamically generated by the security proxy device.

According to a preferred embodiment of the present invention, upon sending the token, the token assigning unit is configured to further send data obtained by using the connection key to encrypt the connection serial number, the connection serial number being generated by the security proxy device;

upon decrypting the request, decrypt to obtain the connection serial number, further verify whether the connection serial number is correct, and forward the request obtained after decryption to the server only when the connection serial number is correct;

upon encrypting the response, the response processing unit is configured to further encrypt the connection serial number, and send the encrypted connection serial number to the client.

According to a preferred embodiment of the present invention, the request processing unit is further configured to: if it is validated that the token sent together with the request is not the token assigned for the client, refuse to process the request.

The present invention further provides a secure communication apparatus arranged at a client, the apparatus comprising:

a key agreement unit for using a key exchange mechanism to perform connection key agreement with the security proxy device;

a token obtaining unit for obtaining a token assigned by the security proxy device to the client after identity authentication for the client succeeds;

a request sending unit for using the connection key or token connection key to encrypt the request sent to the server, and sending the encrypted request together with the token to the security proxy device;

a response obtaining unit for obtaining a response forwarded from the security proxy device, and using the connection key or token connection key to decrypt the response;

wherein the token connection key is assigned by the security proxy device to the client and then encrypted using the connection key and then sent to the client.

According to a preferred embodiment of the present invention, the key agreement unit is specifically configured to:

use a key agreement protection key to encrypt data containing a Client-ID, and send the encrypted data to the security proxy device, wherein the key agreement protection key is configured in advance in the client and the security proxy device;

use the server validation key to decrypt data sent by the security proxy device and containing a security proxy device ID, the server validation key being generated by using the Client-ID;

use the Client-ID and the security proxy device ID obtained from decryption to generate the connection key.

According to a preferred embodiment of the present invention, the data containing a security proxy device ID comprises:

a security proxy device certificate, and a signature obtained by signing the security proxy device ID and the Client-ID by using a root certificate private key of the security proxy device.

According to a preferred embodiment of the present invention, the apparatus further comprise: an identity providing unit configured to send at least one of the Client-ID, client environment information and client signature information to the security proxy device so that the security proxy device performs identity authentication for the client.

According to a preferred embodiment of the present invention, upon sending the client environment information to the security proxy device, the identity providing unit is specifically configured to:

use the connection key to encrypt the client environment information, and send the encrypted client environment information to the security proxy device; the environment information comprises at least one of a Client Device ID, a Client Application Signature and a Client Environment Parameter.

According to a preferred embodiment of the present invention, upon sending the client signature information to the security proxy device, the identity providing unit is specifically configured to:

use the Client-ID and the security proxy device ID to generate the client validation key, use the client validation key to encrypt the client signature information, and send the encrypted client signature information to the security proxy device.

According to a preferred embodiment of the present invention, upon obtaining the token, the token obtaining unit is configured to further obtain a connection serial number encrypted by using the connection key, and use the connection key to decrypt the obtained connection serial number;

upon encrypting the request, the request sending unit is configured to further encrypt the connection serial number;

upon decrypting the response, the response obtaining unit is configured to further decrypt to obtain the connection serial number, validate whether the connection serial number is correct, and discard the response if the connection serial number is not correct.

As can be seen from the above technical solutions, the forwarding of a message between the client and the server is implemented via the security proxy device, a message between the client and the security proxy device is encrypted through an agreed connection key of the key exchange mechanism on the one hand, and on the other hand, control of access to the server is implemented through the token assigned by the security proxy device to the client. Secure communication between the client and the server is guaranteed through the above two aspects.

BRIEF DESCRIPTION OF DRAWINGS

FIG. 1 is a structural diagram of a system which the present invention is based on;

DETAILED DESCRIPTION OF PREFERRED EMBODIMENTS

The present invention will be described below in detail with reference to figures and specific embodiments to make objects, technical solutions and advantages of the present invention more apparent.

Figure 1:
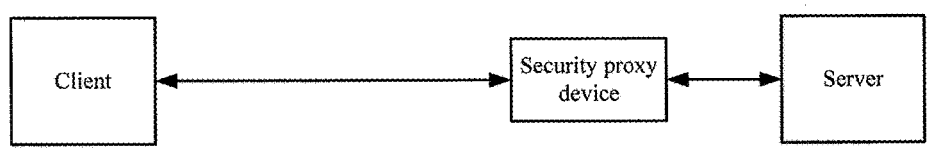

An embodiment of the present invention is based on system architecture as shown in FIG. 1. In this system, a security proxy device is between a client and a server, the security proxy device, as an intermediate device, is responsible for communication security between the client and the server, and interaction data between the client and the server must be forwarded via the security proxy device. To implement the security proxy device's forwarding of interaction data between the client and the server, network setting manners may employ the following network setting manners in advance but are not limited to the following network setting manners:

The first manner: networking the security proxy device at an entrance position to the server so that the interaction data between the client and server must go through the security proxy device.

The second manner: setting in a Domain Name System (DNS) that the domain pointing to the server is resolved to an IP address of the security proxy device such that data transmitted to the server will be transmitted to the security proxy device, and then setting to allow all data received by the security proxy device from the client to be transmitted to the server.

In the embodiment of the present invention, functions of the security proxy device are mainly manifested in the following aspects. Implementation of specific functions will be described in detail in subsequent embodiments.

1) Authenticating an identity of a client.
2) Performing key agreement with the client.
3) Performing token assignment for authenticated clients.
4) Using the token assigned for the client to control the client's access right.
5) Using the key obtained from agreement with the client to perform decryption, integrity check and connection serial number validation for the request sent by the client.
6) Using the key obtained from agreement with the client to encrypt a response returned by the server to the client and then sending it to the client.

Figure 2:
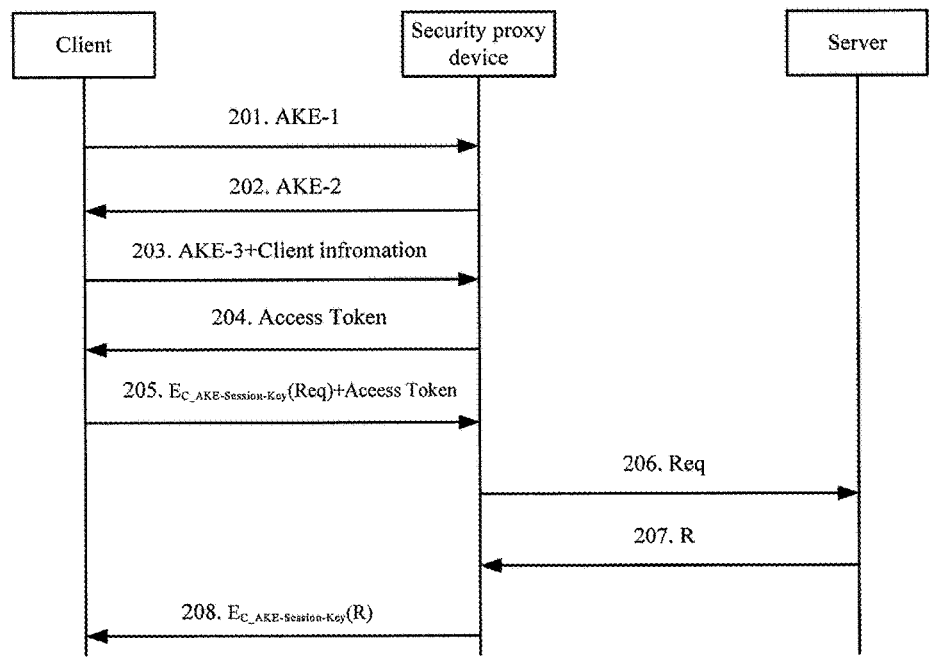
FIG. 2 is a flow chart of a method according to an embodiment of the present invention.

FIG. 2 is a flow chart of a secure communication method according to an embodiment of the present invention. In the present embodiment, the following initial configurations will be performed in advance:

As far as the security proxy device is concerned, the security proxy device may obtain a certificate Proxy-Cert through cloud or an offline tool. The following content is configured in the security proxy device:

1) An identification Proxy-ID of the security proxy device;
2) A key agreement protection key C_AKE-Key;
3) A root certificate public key of the client;
4) Encryption publication parameters p and q.

As far as the client is concerned, when the client is generated, packaging may be performed through cloud or an offline tool. The following content may be embedded in the client in advance:

1) A key agreement protection key C_AKE-Key;
2) The client's identification Client-ID;
3) Encryption publication parameters p and q;
4) An identification Proxy-ID of the security proxy device;
5) A root certificate public key of the security proxy device;
6) The client's application signature.

In addition, the client may register with the security proxy device in advance to obtain a client certificate Client-Cert. For example, when the client is used for the first time, it registers with the security proxy device to obtain the Client-Cert.

After the above initial configurations are performed, the flow as shown in FIG. 2 may begin to proceed. The method may comprise the following steps:

In step 201, a first Authenticated Key Exchange (AKE) processing is performed with an identifier AKE-1 in the figure. In AKE-1, the client uses the key agreement protection key C_AKE-Key to encrypt the data containing the Client-ID and then send it to the security proxy device. An encryption algorithm is configured in advance in the client and the security proxy device. Diffe-Hellman key exchange method may be employed in the embodiment of the present invention. The data obtained after encryption may be represented as follows:

$E_{C\_AKE\text{-}Key}$(Client-ID, ($g^x$ mod p), H($g^x$ mod p)), wherein x is a generated random number, and H($g^x$ mod p) represents a Hash value obtained after performing Hash operation for the $g^x$ mod p.

In step 202, a second Authenticated Key Exchange processing is performed with an identifier AKE-2 in the figure. In AKE-2, the security proxy device decrypts the data sent by the client to obtain Client-ID, i.e., decrypts $E_{C\_AKE\text{-}Key}$(Client-ID, ($g^x$ mod p), H($g^x$ mod p)) to obtain the Client-ID. Authentication is performed for the Client-ID. The authentication may be based on, but is not limited to a preset blacklist/whitelist. If the Client-ID is in the blacklist, it is confirmed that the client is illegal and it's access is prohibited. If the Client-ID is not in the blacklist, the client passes the authentication.

$H(g^x \bmod p))$ may be further used to verify $(g^x \bmod p)$ to perform validation for data integrity.

If the client passes the authentication and validation of $(g^x \bmod p)$ using $H(g^x \bmod p))$ also succeeds, the security proxy device uses the Client-ID to generate a server validation key C_AKE-Session-Key-2. The manner for generating the server validation key may employ, but is not limited to a manner of calculating a Hash value, for example:

C_AKE-Session-Key-2=Hash(2, Client-ID, $g^y$, $g^x$, $g^{xy}$), wherein y is a random number generated by the security proxy device. It is appreciated that "2" in the above equation aims to identify message order, and may also employ other values.

Then, the security proxy device uses C_AKE-Session-Key-2 to encrypt the data containing the Proxy-ID. Specifically, a root certificate private key of the security proxy device may be first used to sign the data containing the Proxy-ID and Client-ID, then the C_AKE-Session-Key-2 be used to encrypt the signature and an integer Proxy-Cert of the security proxy device. The encrypted data may be represented as follows:

$E_{C\_AKE-Session-Key-2}$(Proxy-Cert, $Sig_{Proxy}$(2, Proxy-ID, Client-ID, $g^y$, $g^x$)), wherein $Sig_{Proxy}$ represents using the root certificate private key of the security proxy device to sign, and $Sig_{Proxy}$(2, Proxy-ID, Client-ID, $g^y$, $g^x$) obtained from the signature may be decrypted at the client through the root certification public key of the security proxy device. Likewise, "2" in this equation aims to identify message order, and may also employ other values.

The security proxy device sends the encrypted data to the client. For example, $E_{C\_AKE-Session-Key-2}$(Proxy-Cert, $Sig_{Proxy}$(2, Proxy-ID, Client-ID, $g^y$, $g^x$)) is sent to the client, and meanwhile $g^y \bmod p$ may be sent to the client.

In step 203, a third Authenticated Key Exchange processing is performed with an identifier AKE-3 in the figure. In AKE-3, the client performs decryption and validation for the received data.

Upon decryption, the Client-ID is first used to generate the server validation key C_AKE-Session-Key-2 in the same manner as the manner employed by the security proxy device. Then, the C_AKE-Session-Key-2 is used to decrypt the received data to obtain the Proxy-Cert and $Sig_{Proxy}$(2, Proxy-ID, Client-ID, $g^y$, $g^x$).

Then, the root certificate public key of the security proxy device is used to decrypt $Sig_{Proxy}$(2, Proxy-ID, Client-ID, $g^y$, $g^x$) to obtain the Proxy-ID, Client-ID, $g^y$ and $g^x$. Then $g^y \bmod p$ is validated.

If the validation succeeds, the Client-ID and Proxy-ID are used to generate a client validation key C_AKE-Session-Key-3 and a connection key C_AKE-Session-Key. The manner of generating the client validation key and the connection key may employ, but is not limited to a manner of calculating a Hash value, for example:

C_AKE-Session-Key-3=Hash(3, Client-ID, Proxy-ID, $g^x$, $g^y$, $g^{xy}$). Likewise, "3" in the above equation aims to identify message order, and may also employ other values.

C_AKE-Session-Key=Hash(0, Client-ID, Proxy-ID, $g^x$, $g^y$, $g^{xy}$), wherein "0" aims to identify message order, and may also employ other values.

Then the client uses the client validation key C_AKE-Session-Key-3 to encrypt the data containing the client certificate and the client application signature. The encrypted data may be represented as follows:

$E_{C\_AKE-Session-Key-3}$(Proxy-Cert, $Sig_{Client}$(3, Client-ID, Proxy-ID, $g^x$, $g^y$)), wherein $Sig_{Client}$(3, Client-ID, Proxy-ID, $g^x$, $g^y$)) is the client application signature, and $Sig_{Client}$ means using the root certificate private key of the client to sign.

The connection key C_AKE-Session-Key is used to encrypt client environment information, wherein the client environment information may comprise one of Client Device ID, Client App Sig and Client Environment Parameter or any combination thereof, and may be obtained through a built-in program in the client or a program assigned by the security proxy device. The Client Environment Information may employ configuration file time, Ex-factory ID and the like. Data obtained by encrypting the client environment information by using the connection key C_AKE-Session-Key may be represented as follows:

$E_{C\_AKE-Session-Key}$(Client Device ID, Client App Sig, Client Environment Information)

The data obtained after encryption, $E_{C\_AKE-Session-Key-3}$(Proxy-Cert, $Sign_{Client}$(3, Client-ID, Proxy-ID, $g^x$, $g^y$)) and $E_{C\_AKE-Session-Key}$(Client Device ID, Client App Sig, Client Environment Information) are sent to the security proxy device.

In step 204, allocation of the token to the client is mainly completed.

To ensure security, the security proxy device may, prior to allocating the token, first decrypt the received data, and verify the Client App Sig and the Client Environment Information.

Upon decryption, the security proxy device first generates the client validation key C_AKE-Session-Key-3 and the connection key C_AKE-Session-Key in the same manner as the generating manner at the client as stated in AKE-3. Then C_AKE-Session-Key-3 is used to decrypt the received $E_{C\_AKE-Session-Key-3}$(Proxy-Cert, $Sig_{Client}$(3, Client-ID, Proxy-ID, $g^x$, $g^y$)) and obtain $Sig_{Client}$(3, Client-ID, Proxy-ID, $g^x$, $g^y$), and then perform validation for it; in addition, the C_AKE-Session-Key is used to decrypt the received $E_{C\_AKE-Session-Key}$(Client Device ID, Client App Sig, Client Environment Information) to obtain Client Device ID, Client App Sig and Client Environment Information, and then perform validation for them.

Validation to the client information here, particularly validation to the Client Environment Parameter, e.g., sole device ID, hardware ID, software signature and whether jailbreak or privilege escalation occurs, can further improve anti-attach capability and effectively prevent a disguiser's attack. It needs to be appreciated that since the security proxy device can obtain the Client Environment Parameter while the client registers with the security proxy device in advance, the validation to the Client Environment Parameter here is based on the Client Environment Parameter obtained during the registration.

If the client signature and the client information both pass the validation, the security proxy device assigns an Access Token for the client, and sends said Access Token to the client. When the token is assigned, it may be generated by using the connection key C_AKE-Session-Key and a random parameter, wherein the random parameter may employ for example timestamp. A manner of generating the token is exemplified as follows:

$E_{Access-Token-Enc-Key}$(C_AKE-Session-Key, Client-ID, Session-ID, Time Stamp), that is, the token is obtained by using the token key Access-Token-Enc-Key to encrypt C_AKE-Session-Key, Client-ID, Session-ID (generated by the security proxy device) and Time Stamp, wherein Acess-Token-Enc-Key is only retained by the security proxy device itself and not open to the external. The Session-ID is optional content. If the token is generated using the Session-ID, $E_{C\_AKE-Session-Key}$(Session-ID, Time Stamp) needs to be additionally sent while the token is sent to the client, wherein Time Stamp here is consistent with Time Stamp in the token.

The token may further be generated in another manner, namely, generating a token connection key C_Token-Session-Key and then generating the token in the following way:

$E_{Access-Token-Enc-Key}$(C_Token-Session-Key, Client-ID, Session-ID, Time Stamp), that is, the token is obtained by using the token key Access-Token-Enc-Key to encrypt C_Token-Session-Key, Client-ID, Session-ID and Time Stamp, wherein Access-Token-Enc-Key is only retained by the security proxy device itself and not open to the external. In this case, the following content needs to be sent additionally while the token is sent to the client:

$E_{C\_AKE-Session-Key}$(C_Token-Session-Key, Session-ID, Time Stamp), namely a value obtained by using C_AKE_Session-Key to encrypt C_Token-Session-Key, Session-ID and Time Stamp. Likewise, the Session-ID is optional content, and Time Stamp here is consistent with Time Stamp in the token.

The above steps 201-204 mainly involve the procedure of key agreement and toke assignment. Then the client may begin to communicate with the server by using the agreed key and assigned token.

In step 205, the client uses the connection key C_AKE-Session-Key to encrypt the request sent to the server, and sends the encrypted requests together with the Access Token to the server.

The encrypted request may be represented as: $E_{C\_AKE-Session-Key}$(Req, H(Req)). H(Req) is an optional item.

If in the preceding steps, the security proxy device transfers a token connection key to the client, the token connection key C_Token-Session-Key may be used to encrypt the request in this step. At this time, the encrypted request may be represented as $E_{C\_Token-Session-Key}$(Req, H(Req)), wherein H(Req) is an optional item.

In addition, the Session-ID may be encrypted while the request is encrypted.

In step 206, the security proxy device obtains the above encrypted request and Access Token, uses C_AKE-Session-Key to decrypt the request and verifies the Access Token, that is, verifies whether to assign a token to the client. If the validation succeeds, the decrypted request (represented as Req in the figure) is forwarded to the server. If the validation fails, processing of the received request is refused.

Wherein, after the request is decrypted, the decrypted request may be further checked to see whether it includes an attack code. The check manner may be a manner based on the whitelist or blacklist. The manner based on the whitelist is mainly based on some grammatical formats or preset rules. The manner based on the blacklist is mainly based on some attack code features. If the request is checked as containing an attack code, the forwarding of said request may be refused.

Likewise, in this step the toke connection key C_Token-Session-Key may be used to decrypt the request.

If the Session-ID is encrypted while the request is encrypted in step 205, the step may further comprise processing about integrity validation, namely, validating whether the Session-ID is not used and is in a reasonable range.

C_AKE-Session-Key or C_Token-Session-Key may also be used for the encryption processing of a response in subsequent step 208. In step 208, C_AKE-Session-Key is only taken as an example.

In step 207, the security proxy device obtains a response R returned by the server.

In step 208, the security proxy device uses the connection key C_AKE-Session-Key to encrypt the response R returned by the server, and forwards the encrypted response to the client.

The encrypted response may be represented as $E_{C\_AKE-Session-Key}$(R, H(R)), wherein H(R) is an optional item. The encrypted content may further comprise Session_ID so that the client uses the Session_ID to perform integrity validation.

In the period of validity of the token, the client may directly obtain an access right through the token. When the client communicates with server subsequently, it may, after performing Session-ID+1, repeatedly execute the procedure as shown in step 205-step 208. After the token expires, the client needs to agree about the key and obtain the token again from step 201.

The above describes the method provided by the present invention in detail. The apparatus provided by the present invention will be described in detail below in conjunction with embodiments.

Figure 3:
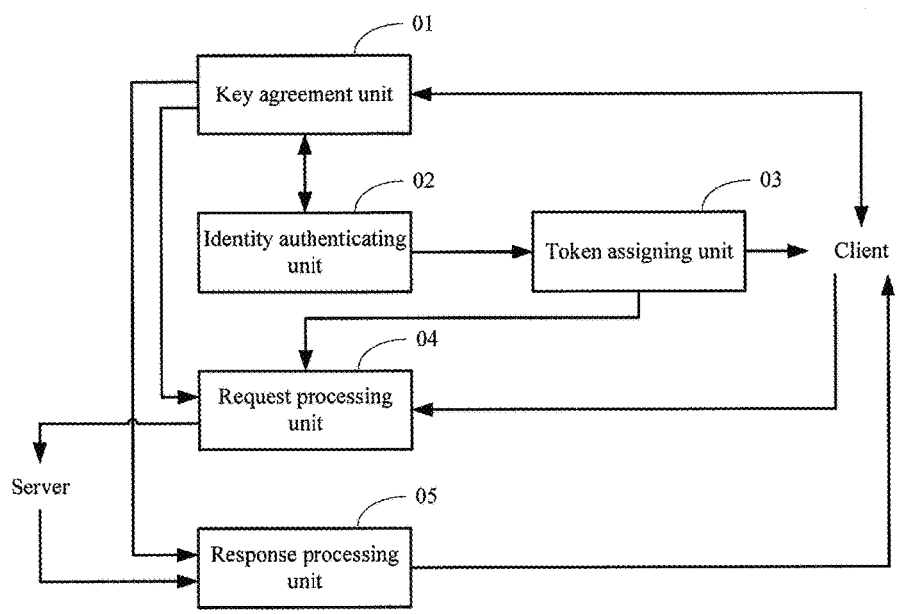
FIG. 3 is a block diagram of an apparatus arranged at a security proxy server according to an embodiment of the present invention.

FIG. 3 is a block diagram of an apparatus arranged at a security proxy server according to an embodiment of the present invention. As shown in FIG. 3, the apparatus may comprise: a key agreement unit 01, an identity authenticating unit 02, a token assigning unit 03, a request processing unit 04 and a response processing unit 05, wherein the above units have the following main functions:

The key agreement unit 01 is responsible for using a key exchange mechanism to perform connection key agreement with the client.

The identity authenticating unit 02 is responsible for performing identity authentication for the client.

The token assigning unit 03 is responsible for assigning a token for the client after the identity authentication for the client succeeds.

The request processing unit 04 is responsible for, after receiving the request sent by the client to the server, validating whether the token sent together with the request is a token assigned for the client; if the validation succeeds, forwarding to the server a request obtained by using the connection key or token connection key to decrypt the request. If it is validated that the token sent together with the request is not the token assigned for the client, refusing to process the request. The token connection key is assigned by the token assigning unit 03 to the client and then encrypted using the connection key and then sent to the client.

The response processing unit 05 is responsible for, after receiving a response returned by the server, using the connection key or token connection key to encrypt the response, and forwarding the encrypted response to the client.

The identity authentication for the client by the above identity authenticating unit 02 may be completed during the connection key agreement. At this time, the token assigning unit 03, upon completion of the connection key agreement, assigns a token for the client.

Specifically, the key agreement unit 01 may perform the following operations:

Operation 1: using the key agreement protection key to decrypt the data sent by the client and containing a Client-ID, wherein the key agreement protection key is configured in advance in the client and the security proxy device. For example, decrypting $E_{C\_AKE-Key}$(Client-ID, ($g^x$ mod p), H($g^x$ mod p)) sent by the client to obtain the Client-ID. Here, the H($g^x$ mod p) may be further used to perform validation for ($g^x$ mod p) in order to verify data integrity. Operation 2 is performed after the validation succeeds.

Operation 2: using the Client-ID obtained from the decryption to generate a server validation key, e.g., use C_AKE-Session-Key-2=Hash(2, Client-ID, $g^y$, $g^x$, $g^{xy}$) to generate the server validation key C_AKE-Session-Key-2.

Operation 3: using the server validation key to encrypt data containing a security proxy device ID, sending the encrypted data to the client so that the client uses the Client-ID and the security proxy device ID to generate the connection key. When the server validation key is used to encrypt data containing the security proxy device ID, a root certificate private key of the security proxy device may be used to sign the security proxy device ID and the Client-ID; then the server validation key may be used to encrypt the signature and the certificate of the security proxy device. For example, $E_{C\_AKE-Session-Key-2}$(Proxy-Cert, $Sig_{Proxy}$(2, Proxy-ID, Client-ID, $g^y$, $g^x$)) may be used, wherein $Sig_{Proxy}$ represents using the root certificate private key of the security proxy device to sign, and $Sig_{Proxy}$(2, Proxy-ID, Client-ID, $g^y$, $g^x$) obtained from the signature may be decrypted at the client through a root certification public key of the security proxy device.

The above operation corresponds to step 202 in FIG. 2.

Operation 4: using the client-ID and the security proxy device ID to generate a connection key. The connection key is generated in the same manner consistent with the client, for example, C_AKE-Session-Key=Hash(0, Client-ID, Proxy-ID, $g^x$, $g^y$, $g^{xy}$) is employed to generate the connection key C_AKE-Session-Key. The above operation corresponds to step 204 in FIG. 2.

The identity authenticating unit 02 may perform identity authentication for the client in the following manners or any combination of the following manners, but not limited to the following manners:

The first manner: authenticating the Client-ID after obtaining the Client-ID. The identity authenticating unit 02 may verify the Client-ID after the key agreement unit 01 performs the above operation 1 and obtains the Client-ID. The authentication may, based on a whitelist or blacklist, judge whether the Client-ID is in a preset blacklist. If no, the client passes the identity authentication; if yes, the client fails to pass the validation. Alternatively, judgment is performed as to whether the Client-ID is in a preset whitelist: if yes, the client passes the identity authentication; if no, the client fails to pass the validation.

The second manner: validating Client Environment Information after obtaining the Client Environment Information. After generating the connection key, the client may use the connection key to encrypt the Client Environment Information and then send it to the security proxy device. Hence, the identity authenticating unit 02 may, after the operation 4 generates the connection key, use the connection key to decrypt the received Client Environment Information, and then verify the Client Environment Information. The Client Environment Information comprises at least one of a client device ID, a client application signature and a client environment parameter. Here, validation is especially performed for the client environment parameter. It needs to be appreciated that since the security proxy device can obtain the Client Environment Parameter while the client registers with the security proxy device in advance, the validation to the Client Environment Parameter here is based on the Client Environment Parameter obtained during the registration.

The third manner: validating client application signature information after obtaining the client application signature information. Upon generating the connection key, the client may generates a client validation key, and use the client validation key to encrypt the client application signature and then send it to the security proxy device. The security proxy device uses the Client-ID and the security proxy device ID to generate the client validation key in the same manner as the client, then uses the client validation key to decrypt the client application signature, and then verifies the client application signature.

The above token assigning unit 03, upon assigning a token to the client, may use a token key to encrypt data containing the connection key and a random parameter or encrypt data containing the toke connection key and the random parameter to obtain the token assigned for the client. The token key is preset in the security proxy device or dynamically generated by the security proxy device. For example, $E_{Access-Token-Enc-Key}$(C_AKE-Session-Key, Client-ID, Session-ID, Time Stamp), that is, the token is obtained by using the token key Access-Token-Enc-Key to encrypt C_AKE-Session-Key, Client-ID, Session-ID (connection serial number) and Time Stamp, wherein Acess-Token-Enc-Key is only retained by the security proxy device itself and not open to the external, and wherein the Session-ID is optional content.

The token may further be generated in another manner, namely, generating a token connection key C_Token-Session-Key and then generating the token in the following way:

$E_{Access-Token-Enc-Key}$(C_Token-Session-Key, Client-ID, Session-ID, Time Stamp), that is, the token is obtained by using the token key Access-Token-Enc-Key to encrypt C_Token-Session-Key, Client-ID, Session-ID and Time Stamp, wherein Access-Token-Enc-Key is only retained by the security proxy device itself and not open to the external.

Furthermore, the token assigning unit 03, upon sending a token, further sends data obtained by using the connection key to encrypt the connection serial number. Upon decrypting the request, the request processing unit 04 decrypts to obtain the connection serial number, further verifies whether the connection serial number is correct, and forwards the request obtained after decryption to the server only when the connection serial number is correct. The response processing unit 05, upon encrypting the response, further encrypts the connection serial number, and sends the encrypted connection serial number to the client.

Figure 4:
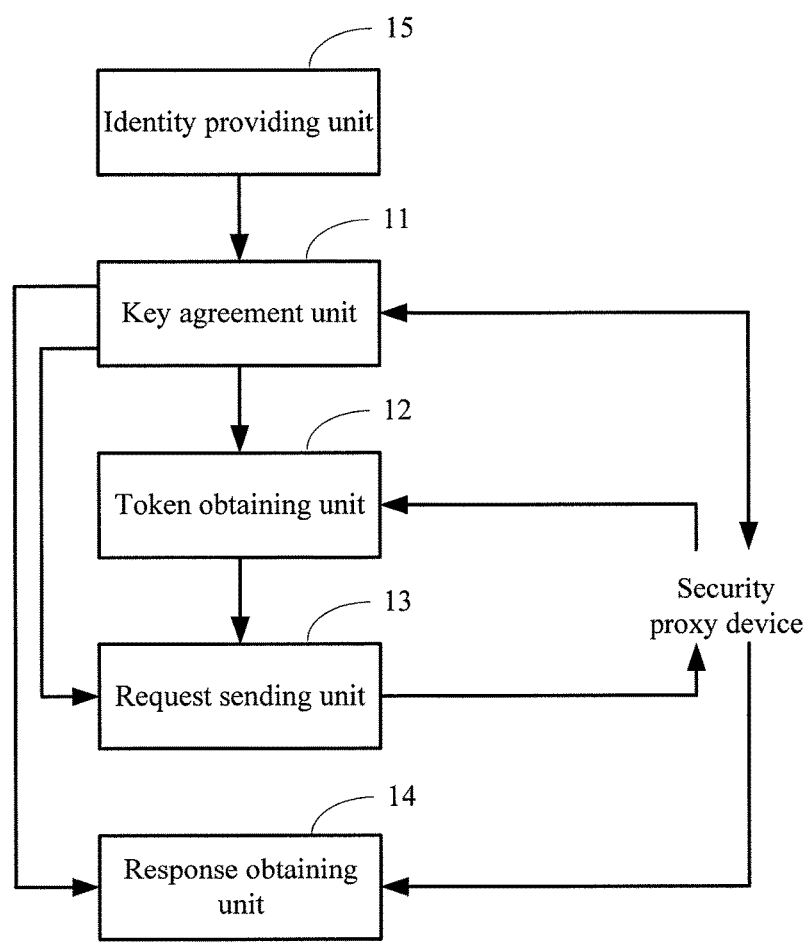
FIG. 4 is a block diagram of an apparatus arranged at a client according to an embodiment of the present invention.

FIG. 4 is a block diagram of an apparatus arranged at a client according to an embodiment of the present invention. As shown in FIG. 4, the apparatus may comprises: a key agreement unit 11, a token obtaining unit 12, a request sending unit 13, a response obtaining unit 14 as well as an identity providing unit 15, wherein the above units have the following main functions:

The key agreement unit 11 is responsible for using a key exchange mechanism to perform connection key agreement with the security proxy device.

The token obtaining unit 12 is responsible for obtaining a token assigned by the security proxy device to the client after identity authentication for the client succeeds.

The request sending unit 13 is responsible for using the connection key or token connection key to encrypt the request sent to the server, and sending the encrypted request together with the token to the security proxy device.

The response obtaining unit 14 is responsible for obtaining a response forwarded from the security proxy device, and using the connection key or token connection key to decrypt the response.

Wherein the token connection key is assigned by the security proxy device to the client and then encrypted using the connection key and then sent to the client.

Specifically, the key agreement unit 11 may perform the following operations:

Operation 1: using the key agreement protection key to encrypt data containing a Client-ID, and sending the encrypted data to the security proxy device, wherein the key agreement protection key is configured in advance in the client and the security proxy device. For example, $E_{C\_AKE\text{-}Key}$(Client-ID, ($g^x$ mod p), H($g^x$ mod p)) is sent to the security proxy device. The operation corresponds to step 101 in FIG. 2.

Operation 2: using the server validation key to decrypt data containing a security proxy device ID, the server validation key being generated by using the Client-ID. In this operation, first the Client-ID may be used to generate the server validation key C_AKE-Session-Key-2 in the same manner as the manner employed by the security proxy device. Then, the server validation key is used to decrypt the data sent by the security proxy device to obtain a security proxy device certificate Proxy-Cert, and a root certificate private key of the security proxy device is used to perform signature $Sig_{Proxy}$(2, Proxy-ID, Client-ID, $g^y$,$g^x$) for the security proxy device identity Proxy-ID and the Client-ID. Then a root certificate public key of the security proxy device is used to decrypt $Sig_{Proxy}$(2, Proxy-ID, Client-ID, $g^y$,$g^x$) and obtain the security proxy device identity Proxy-ID.

Operation 3: use the Client-ID and the security proxy device ID obtained from decryption to generate a connection key. For example, C_AKE-Session-Key=Hash(0, Client-ID, Proxy-ID, $g^x$, $g^y$, $g^{xy}$) may be employed to generate the connection key C_AKE-Session-Key.

The identity providing unit 15 may send at least one of Client-ID, client environment information and client signature information to the security proxy device so that the security proxy device performs identity authentication for the client.

Wherein the identity providing unit 15 may provide the Client-ID to the security proxy device through the above operation 1.

The identity providing unit 15, upon sending the client environment information to the security proxy device, may use the connection key to encrypt the client environment information, and send the encrypted client environment information to the security proxy device; the environment information comprises at least one of Client Device ID, Client Application Signature and Client Environment Parameter. For example, data obtained by using the connection key C_AKE-Session-Key to encrypt the client environment information may be represented as follows:

$E_{C\_AKE\text{-}Session\text{-}Key}$(Client Device ID, Client App Sig, Client Environment Information)

The identity providing unit 15, upon sending the client signature information to the security proxy device, may use the Client-ID and the security proxy device ID to generate the client validation key, use the client validation key to encrypt the client signature information, and send the encrypted client signature information to the security proxy device. For example, the client validation key C_AKE-Session-Key-3 may be generated in the following manner: C_AKE-Session-Key-3=Hash(3, Client-ID, Proxy-ID, $g^x$, $g^y$, $g^{xy}$). Using the client validation key to encrypt the client signature information may be represented as: $E_{C\_AKE\text{-}Session\text{-}Key\text{-}3}$(Proxy-Cert, $Sig_{Client}$(3, Client-ID, Proxy-ID, $g^x$, $g^y$)), wherein $Sig_{Client}$(3, Client-ID, Proxy-ID, $g^x$, $g^y$)) is the client application signature, and $Sig_{Client}$ means using the root certificate private key of the client to sign.

In addition, the token obtaining unit 12, upon obtaining a token, further obtains a connection serial number encrypted by using the connection key, and uses the connection key to decrypt the obtained connection serial number. Upon encrypting the request, the request sending unit 13 further encrypts the connection serial number. The response obtaining unit 14, upon decrypting the received response, further decrypts to obtain the connection serial number, validates whether the connection serial number is correct, and discards the response if the connection serial number is not correct.

It is appreciated that the present invention does not limit encryption and decryption algorithms so long as it is ensured that the client and the security proxy device use consistent encryption and decryption algorithms.

According to the method and apparatus provided by the present invention, on the one hand, a message between the client and the security proxy device is encrypted through an agreed connection key to prevent data leakage, and on the other hand, control of access to the server is implemented through the token assigned by the security proxy device to the client, to prevent Man-in-the-Middle' illegal attack to the server and illegal client's access to the server. Secure communication between the client and the server is guaranteed through this mechanism.

In the embodiments of the present invention, it should be understood that the devices and methods disclosed can be implemented through other ways. For example, the embodiments for the devices are only exemplary, e.g., the division of the units is merely logical one, and, in reality, they can be divided in other ways.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized as hardware, or they can be realized with hardware and software functional unit.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present invention. The aforementioned storage medium includes various media that may store program codes, such as U disk, removable hard disk, read-only memory (ROM), a random access memory (RAM), magnetic disk, or an optical disk.

The foregoing is only preferred embodiments of the present invention, not intended to limit the invention. Any modifications, equivalent replacements, improvements and the like made within the spirit and principles of the present invention, should all be included in the present invention within the scope of protection.

What is claimed is:

1. A secure communication method, wherein the method is executed by a security proxy device between a client and a server, the method comprising:
    using a key exchange mechanism to perform connection key agreement with the client; and assigning a token for the client after identity authentication for the client succeeds;
    upon receiving a request sent by the client to the server, validating whether the token sent together with the request is a token assigned for the client; if the validation succeeds, forwarding to the server a decrypted request obtained by using the connection key or a token connection key, wherein the token connection key is assigned for the client and then sent to the client by using the connection key;
    after receiving a response returned by the server, using the connection key or token connection key to encrypt the response, and forwarding the encrypted response to the client.

2. The method according to claim 1, wherein the identity authentication for the client is performed during the connection key agreement;
    the token is assigned for the client after the connection key agreement.

3. The method according to claim 1, wherein using a key exchange mechanism to perform connection key agreement with the client comprises:
    using a key agreement protection key to decrypt data sent by the client and containing a Client-ID, wherein the key agreement protection key is configured in advance in the client and the security proxy device;
    using the Client-ID obtained from the decryption to generate a server validation key;
    using the server validation key to encrypt data containing a security proxy device ID, and sending the encrypted data to the client so that the client uses the Client-ID and the security proxy device ID to generate the connection key;
    using the client-ID and the security proxy device ID to generate the connection key.

4. The method according to claim 3, wherein using the server validation key to encrypt data containing a security proxy device ID comprises:
    using a root certificate private key of the security proxy device to sign the security proxy device ID and the Client-ID;
    using the server validation key to encrypt the signature and the certificate of the security proxy device.

5. The method according to claim 1, wherein the identity authentication for the client comprises:
    authenticating the Client-ID after obtaining the Client-ID;
    validating Client Environment Information after obtaining the Client Environment Information;
    validating client signature information after obtaining the client signature information.

6. The method according to claim 5, wherein obtaining the Client Environment Information comprises:
    using the connection key to decrypt the Client Environment Information sent by the client, the Client Environment Information comprising at least one of a client device ID, a client application signature and a client environment parameter.

7. The method according to claim 1, wherein assigning the token for the client comprises:
    using a token key to encrypt data containing the connection key and a random parameter or encrypt data containing the token connection key and the random parameter to obtain the token assigned for the client, the token key being preset in the security proxy device or dynamically generated by the security proxy device.

8. The method according to claim 7, wherein upon sending the token, further sending data obtained by using the connection key to encrypt a connection serial number, the connection serial number being generated by the security proxy device;
    upon decrypting the request, decrypting to obtain the connection serial number, further validating whether the connection serial number is correct, and forwarding the request obtained after decryption to the server only when the connection serial number is correct;
    upon encrypting the response, further encrypting the connection serial number, and sending the encrypted connection serial number to the client.

9. The method according to claim 1, wherein the method further comprises:
    if it is validated that the token sent together with the request is not the token assigned for the client, refusing to process the request.

10. A secure communication method, wherein the method is applied to a system comprising a client, a security proxy device and a server, and the method comprises:
    the client using a key exchange mechanism to perform connection key agreement with the security proxy device, and obtaining a token assigned by the security proxy device to the client after identity authentication for the client succeeds;
    using the connection key or a token connection key to encrypt the request sent to the server, and sending the encrypted request together with the token to the security proxy device;
    obtaining a response forwarded from the security proxy device, and using the connection key or token connection key to decrypt the response;
    wherein the token connection key is assigned by the security proxy device to the client and then encrypted using the connection key and then sent to the client.

11. The method according to claim 10, wherein the client using a key exchange mechanism to perform connection key agreement with the security proxy device comprises:
    using a key agreement protection key to encrypt data containing a Client-ID, and sending the encrypted data to the security proxy device, wherein the key agreement protection key is configured in advance in the client and the security proxy device;
    using a server validation key to decrypt data sent by the security proxy device and containing a security proxy device ID, the server validation key being generated by using the Client-ID;
    using the Client-ID and the security proxy device ID obtained from decryption to generate the connection key.

12. The method according to claim 11, wherein the data containing a security proxy device ID comprises:
    a security proxy device certificate, and a signature obtained by signing the security proxy device ID and the Client-ID by using a root certificate private key of the security proxy device.

13. The method according to claim 10, wherein the method further comprises:
the client sending at least one of the Client-ID, client environment information and client signature information to the security proxy device so that the security proxy device performs identity authentication for the client.

14. The method according to claim 13, wherein the client sending the client environment information to the security proxy device comprises:
using the connection key to encrypt the client environment information, and sending the encrypted client environment information to the security proxy device; the environment information comprising at least one of a Client Device ID, a Client Application Signature and a Client Environment Parameter.

15. The method according to claim 10, wherein upon obtaining the token, further obtaining a connection serial number encrypted by using the connection key, and using the connection key to decrypt the obtained connection serial number;
upon encrypting the request, further encrypting the connection serial number;
upon decrypting the response, further decrypting to obtain the connection serial number, validating whether the connection serial number is correct, and discarding the response if the connection serial number is not correct.

16. A secure communication apparatus, wherein the apparatus is in a security proxy device between a client and a server, the apparatus comprising:
a key agreement unit for using a key exchange mechanism to perform connection key agreement with the client;
an identity authenticating unit for performing identity authentication for the client;
a token assigning unit for assigning a token for the client after the identity authentication for the client succeeds;
a request processing unit for, after receiving the request sent by the client to the server, validating whether the token sent together with the request is a token assigned for the client; if the validation succeeds, forwarding to the server a decrypted request obtained by using the connection key or token connection key; wherein the token connection key is assigned by the token assigning unit to the client and then encrypted using the connection key and then sent to the client;
a response processing unit for, after receiving a response returned by the server, using the connection key or token connection key to encrypt the response, and forwarding the encrypted response to the client.

17. The apparatus according to claim 16, wherein the identity authenticating unit performs identity authentication for the client during the connection key agreement;
the token assigning unit assigns a token to the client after the connection key agreement.

18. The apparatus according to claim 16, wherein the key agreement unit specifically performs the following:
using a key agreement protection key to decrypt data sent by the client and containing a Client-ID, wherein the key agreement protection key is configured in advance in the client and the security proxy device;
using the Client-ID obtained from the decryption to generate a server validation key;
using the server validation key to encrypt data containing a security proxy device ID, and sending the encrypted data to the client so that the client uses the Client-ID and the security proxy device ID to generate the connection key;
using the client-ID and the security proxy device ID to generate the connection key.

19. The apparatus according to claim 18, wherein upon using the server validation key to encrypt data containing a security proxy device ID, the key agreement unit specifically performs the following:
using a root certificate private key of the security proxy device to sign the security proxy device ID and the Client-ID;
using the server validation key to encrypt the signature and the certificate of the security proxy device.

20. The apparatus according to claim 16, wherein the identity authenticating unit is specifically configured to:
authenticate the Client-ID after obtaining the Client-ID;
validate Client Environment Information after obtaining the Client Environment Information;
validate client signature information after obtaining the client signature information.

21. The apparatus according to claim 20, wherein upon obtaining the Client Environment Information, the identity authenticating unit is specifically configured to:
use the connection key to decrypt the Client Environment Information sent by the client; the Client Environment Information comprises at least one of a client device ID, a client application signature and a client environment parameter.

22. The apparatus according to claim 16, wherein upon assigning the token for the client, the token assigning unit is specifically configured to:
use a token key to encrypt data containing the connection key and a random parameter or encrypt data containing the token connection key and the random parameter to obtain the token assigned for the client, the token key being preset in the security proxy device or dynamically generated by the security proxy device.

23. The apparatus according to claim 22, wherein upon sending the token, the token assigning unit is configured to further send data obtained by using the connection key to encrypt the connection serial number, the connection serial number being generated by the security proxy device;
upon decrypting the request, decrypt to obtain the connection serial number, further verify whether the connection serial number is correct, and forward the request obtained after decryption to the server only when the connection serial number is correct;
upon encrypting the response, the response processing unit is configured to further encrypt the connection serial number, and send the encrypted connection serial number to the client.

24. The apparatus according to claim 16, wherein the request processing unit is further configured to: if it is validated that the token sent together with the request is not the token assigned for the client, refuse to process the request.

25. A secure communication apparatus, wherein the secure communication apparatus is arranged at a client, and comprises:
a key agreement unit for using a key exchange mechanism to perform connection key agreement with a security proxy device;
a token obtaining unit for obtaining a token assigned by the security proxy device to the client after identity authentication for the client succeeds;
a request sending unit for using the connection key or token connection key to encrypt the request sent to the server, and sending the encrypted request together with the token to the security proxy device;

a response obtaining unit for obtaining a response forwarded from the security proxy device, and using the connection key or token connection key to decrypt the response;

wherein the token connection key is assigned by the security proxy device to the client and then encrypted using the connection key and then sent to the client.

26. The apparatus according to claim 25, wherein the key agreement unit is specifically configured to:

use a key agreement protection key to encrypt data containing a Client-ID, and send the encrypted data to the security proxy device, wherein the key agreement protection key is configured in advance in the client and the security proxy device;

use a server validation key to decrypt data sent by the security proxy device and containing a security proxy device ID, the server validation key being generated by using the Client-ID;

use the Client-ID and the security proxy device ID obtained from decryption to generate the connection key.

27. The apparatus according to claim 26, wherein the data containing the security proxy device ID comprises:

a security proxy device certificate, and a signature obtained by signing the security proxy device ID and the Client-ID by using a root certificate private key of the security proxy device.

28. The apparatus according to claim 25, wherein the apparatus further comprise: an identity providing unit configured to send at least one of the Client-ID, client environment information and client signature information to the security proxy device so that the security proxy device performs identity authentication for the client.

29. The apparatus according to claim 28, wherein upon sending the client environment information to the security proxy device, the identity providing unit is specifically configured to:

use the connection key to encrypt the client environment information, and send the encrypted client environment information to the security proxy device; the environment information comprises at least one of Client Device ID, a Client Application Signature and a Client Environment Parameter.

30. The apparatus according to claim 25, wherein upon obtaining the token, the token obtaining unit is configured to further obtain a connection serial number encrypted by using the connection key, and use the connection key to decrypt the obtained connection serial number;

upon encrypting the request, the request sending unit is configured to further encrypt the connection serial number;

upon decrypting the response, the response obtaining unit is configured to further decrypt to obtain the connection serial number, validate whether the connection serial number is correct, and discard the response if the connection serial number is not correct.

* * * * *